(12) United States Patent
Rinne et al.

(10) Patent No.: US 9,783,981 B2
(45) Date of Patent: Oct. 10, 2017

(54) INSULATION WITH INSTALLATION GUIDE AND APPARATUS AND METHOD FOR INSTALLING SAME

(71) Applicant: Owens Corning Intellectual Capital, LLC, Toledo, OH (US)

(72) Inventors: James W. Rinne, Granville, OH (US); Harry Alter, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/698,080

(22) Filed: Apr. 28, 2015

(65) Prior Publication Data

US 2016/0319537 A1 Nov. 3, 2016

(51) Int. Cl.
| | |
|---|---|
| E04B 1/76 | (2006.01) |
| B32B 3/06 | (2006.01) |
| B32B 29/00 | (2006.01) |
| B25C 5/06 | (2006.01) |
| B25C 5/10 | (2006.01) |

(52) U.S. Cl.
CPC .............. *E04B 1/767* (2013.01); *B25C 5/06* (2013.01); *B25C 5/10* (2013.01); *B32B 3/06* (2013.01); *B32B 29/002* (2013.01); *B32B 2250/02* (2013.01); *B32B 2262/062* (2013.01); *B32B 2305/28* (2013.01); *B32B 2307/304* (2013.01); *B32B 2419/00* (2013.01); *B32B 2607/00* (2013.01)

(58) Field of Classification Search
CPC ... E04B 1/767; E04B 1/76666; B32B 29/002; B32B 2250/02; B32B 2262/062; B32B 2307/304; B32B 2419/00; B32B 2607/00; B32B 2305/28; B32B 3/06
USPC ........... 52/404.1, 406.1, 406.2, 406.3, 407.3, 52/407.4
See application file for complete search history.

(56) References Cited

U.S. PATENT DOCUMENTS

| 2,271,575 | A | * | 2/1942 | Waterman | ............... | E04B 1/767 |
| | | | | | | 112/428 |
| 2,406,801 | A | * | 9/1946 | Byers | ....................... | D21J 1/16 |
| | | | | | | 156/301 |

(Continued)

FOREIGN PATENT DOCUMENTS

| DE | EP 0432467 A1 * | 6/1991 | .......... E04B 1/7654 |
| EP | 1231029 | 8/2002 | |

(Continued)

*Primary Examiner* — Adriana Figueroa
(74) *Attorney, Agent, or Firm* — Calfee, Halter & Griswold LLP

(57) ABSTRACT

A fibrous insulation member, a mechanism for attaching the insulation member to a building structure, and a method for attaching the insulation member to a structure utilizing the mechanism. The insulation member including a fibrous insulation body having a first lateral surface, a second lateral surface spaced apart from the first lateral surface, and a face extending from the first lateral surface to the second lateral surface. The insulation member also including a facing having a first portion attached to the face and extending the width of the face, and a second portion extending beyond the first lateral surface, the second portion having a first thickness and including a first guide having a second thickness greater than the first thickness.

14 Claims, 7 Drawing Sheets

(56) References Cited

U.S. PATENT DOCUMENTS

| | | | | |
|---|---|---|---|---|
| 3,140,220 A * | 7/1964 | Walter | E04B 1/767 | 156/271 |
| 3,318,063 A * | 5/1967 | Stone | E04B 1/66 | 428/124 |
| 3,476,301 A | 11/1969 | Auston | | |
| 3,729,879 A * | 5/1973 | Franklin | E04B 1/767 | 428/40.1 |
| 3,835,604 A * | 9/1974 | Hoffmann, Jr. | E04B 1/767 | 428/126 |
| 4,569,174 A * | 2/1986 | Bossany | E04B 1/767 | 52/406.1 |
| 4,709,523 A * | 12/1987 | Broderick | E04B 1/767 | 428/124 |
| 5,421,133 A * | 6/1995 | Berdan, II | E04B 1/767 | 156/71 |
| 5,524,807 A | 6/1996 | Bullard | | |
| 5,791,547 A | 8/1998 | Yang | | |
| 6,403,208 B1 * | 6/2002 | Otaki | E04B 1/767 | 156/285 |
| 6,468,615 B2 * | 10/2002 | Weinstein | B32B 3/08 | 428/124 |
| 6,579,586 B1 * | 6/2003 | Fay | E04B 1/767 | 428/192 |
| 6,793,993 B2 * | 9/2004 | Ray | B32B 27/18 | 428/215 |
| 6,901,711 B2 * | 6/2005 | Fay | E04B 1/767 | 156/71 |
| 6,925,765 B2 * | 8/2005 | Fay | E04B 1/767 | 428/43 |
| 7,165,368 B2 * | 1/2007 | Knapp | E04B 1/767 | 428/131 |
| 7,252,868 B2 * | 8/2007 | Suda | B32B 5/24 | 156/247 |
| 7,354,478 B2 * | 4/2008 | Yang | B32B 5/26 | 118/304 |
| 7,544,267 B2 * | 6/2009 | Suda | B32B 5/24 | 156/307.1 |
| 7,918,374 B2 | 4/2011 | Gardner et al. | | |
| 8,413,867 B2 | 4/2013 | Gardner et al. | | |
| 8,438,789 B2 * | 5/2013 | Uhl | E04B 9/003 | 52/19 |
| 8,595,986 B2 * | 12/2013 | Uhl | E04B 9/003 | 52/19 |
| 2004/0163345 A1 * | 8/2004 | Alderman | B32B 5/02 | 52/404.1 |
| 2007/0163196 A1 * | 7/2007 | Barrow | E04B 1/767 | 52/406.3 |
| 2008/0105726 A1 | 5/2008 | Batho | | |
| 2011/0180580 A1 | 7/2011 | Gardner et al. | | |
| 2015/0218802 A1 | 8/2015 | Wolf | | |
| 2015/0218803 A1 | 8/2015 | Rockwell et al. | | |
| 2015/0233110 A1 | 8/2015 | Alter et al. | | |

FOREIGN PATENT DOCUMENTS

| | | | |
|---|---|---|---|
| EP | 1499478 | 1/2005 | |
| NL | 9302102 A * | 7/1995 | E04B 1/767 |
| NL | 1002930 C2 * | 10/1997 | E04B 1/767 |
| WO | 03/092961 | 11/2003 | |

\* cited by examiner

INSULATION WITH INSTALLATION GUIDE AND APPARATUS AND METHOD FOR INSTALLING SAME

FIELD OF THE INVENTION

The present application generally relates to thermal insulation and, more particularly, to thermal insulation with an integrated installation guide.

BACKGROUND OF THE INVENTION

Thermal insulation in buildings reduces unwanted heat loss or gain and can decrease the energy demands of heating and cooling systems. Thermal insulation, such as fiberglass insulation, works by decreasing the amount of heat entering a building from outside in hot weather, and trapping warmth inside the building in cold weather. Walls, ceilings, roof, floors, and attics are common areas where insulation is applied.

Batts are precut sections of insulation that are designed for easy handling and use between framing members, such as studs and joists, in floors, walls, attics and ceilings. Like batt insulation, rolled insulation is available in pre-cut widths to fit between framing members, but comes in longer continuous lengths for use in areas where longer runs are needed. Batts and rolls are available either with or without facing, such as paper facing or aluminum foil facing. Batts and rolls with facing may be secured in place between framing members by stapling the facing material to the framing members. For example, "inset stapling" refers to securing the batt or roll in place between framing members by stapling the facing material to the side surfaces of the framing members.

The effectiveness of thermal insulation is commonly evaluated by its R-value, a measure of thermal resistance for a particular material. The R-value (thermal resistance) of insulation, such as insulation batts, is reduced where the insulation is compressed.

SUMMARY OF THE INVENTION

A fibrous insulation member, a mechanism for attaching the insulation member to a building structure, and a method for attaching the insulation member to a structure utilizing the mechanism. The insulation member including a fibrous insulation body having a first lateral surface, a second lateral surface spaced apart from the first lateral surface, and a face extending from the first lateral surface to the second lateral surface. The insulation member also including a facing having a first portion attached to the face and extending the width of the face, and a second portion extending beyond the first lateral surface, the second portion having a first thickness and including a first guide having a second thickness greater than the first thickness.

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

BRIEF DESCRIPTION OF THE DRAWINGS

The accompanying drawings, which are incorporated in and constitute a part of this specification, illustrate some embodiments disclosed herein, and together with the description, serve to explain principles of the embodiments disclosed herein.

FIG. 3a is an enlarged view of a channel portion of the mechanism of FIG. 3;

DETAILED DESCRIPTION OF THE INVENTION

The embodiments disclosed herein will now be described by reference to some more detailed embodiments, in view of the accompanying drawings. These embodiments may, however, be embodied in different forms and should not be construed as limited to the embodiments set forth herein. Rather, these embodiments are provided so that this disclosure will be thorough and complete, and will fully convey the scope of the inventions to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. Every numerical range given throughout this specification and claims will include every narrower numerical range that falls within such broader numerical range, as if such narrower numerical ranges were all expressly written herein.

Figure 1:
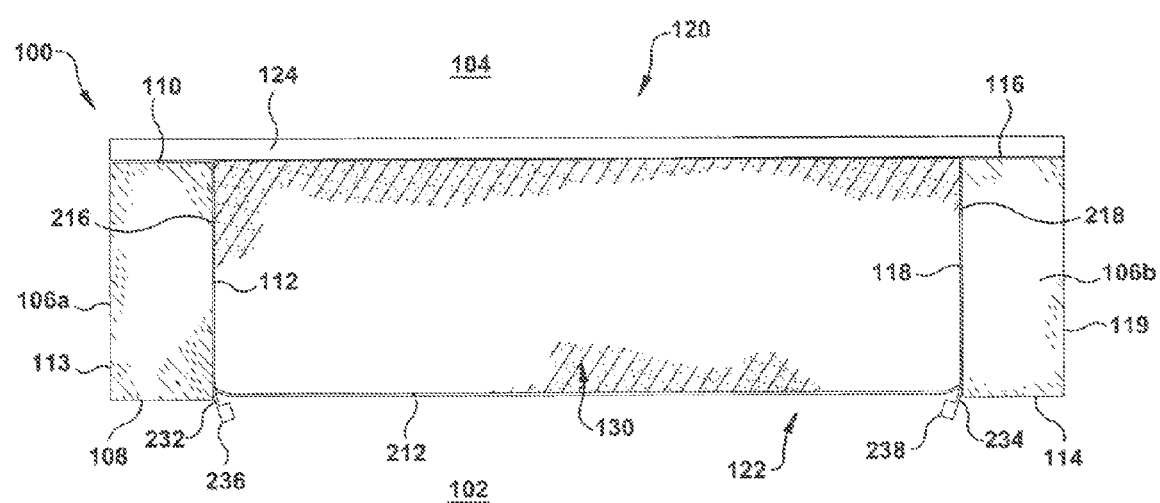
FIG. 1 is a top sectional view of an exemplary embodiment of an insulation member positioned between structural framing members.

Referring now to FIG. 1, an exemplary embodiment of a building structural barrier, such as non-limiting examples of walls, floors, ceilings, and roofs, is shown generally at 100. The structural barrier 100 is configured to separate the interior areas 102 of the building from exterior areas 104 of the building. The structural barrier 100 can be formed from various structural framing members 106, such as the non-limiting examples of wall studs, joists, rafters, or trusses. In certain exemplary embodiments, the structural framing members 106 are made of wood, but in other embodiments, the structural framing members can be made of other desired materials, including the non-limiting example of aluminum and steel. The structural framing members 106 can have any desired dimensions and can be spaced apart from each other at various distances. In one exemplary embodiment, the structural barrier 100 is a building side wall and the structural framing members 106 are wall studs, such as for example 2"×4" or 2"×6" dimensional lumber, with spacing of 12 inches (305 mm), 16 inches (406 mm) or 24 inches (610 mm) on center.

FIG. 1 illustrates a first structural framing member 106a having an inner face 108, an outer face 110, a first side surface 112, and a second side surface 113. A second structural framing member 106a is spaced apart from the first structural framing member 106a. The second structural framing member 106b includes an inner face 114, an outer face 116, a first side surface 118 facing the first side surface 112 of the first framing member 106a, and a second side surface 119.

The structural barrier 100 has an exterior side 120 and an interior side 122. The exterior side 120 may be covered by an exterior sheathing 124 that is attached to various structural framing members 106, such as, for example, to the first and second outer faces 110, 116 of the first and second structural framing members 106a, 106b. The exterior sheathing 124 is configured to provide rigidity to the structural barrier 100 and also configured to provide a surface for exterior wall coverings, such as for example brick, wood, stucco or vinyl siding (not shown). In the exemplary embodiment, the exterior sheathing 124 is made of oriented strand board (OSB). In other embodiments, however, the exterior sheathing 124 can be made of other suitable materials, such as for example plywood, waferboard, rigid foam or fiberboard.

The interior side 122 of the structural barrier 100 can be covered by a construction material (not shown), such as for example sections or panels of gypsum or drywall. In other embodiments, the construction material (not shown) can be any desired material or combination of materials, such as the non-limiting examples of paneling, tile or masonry products.

Figure 2:
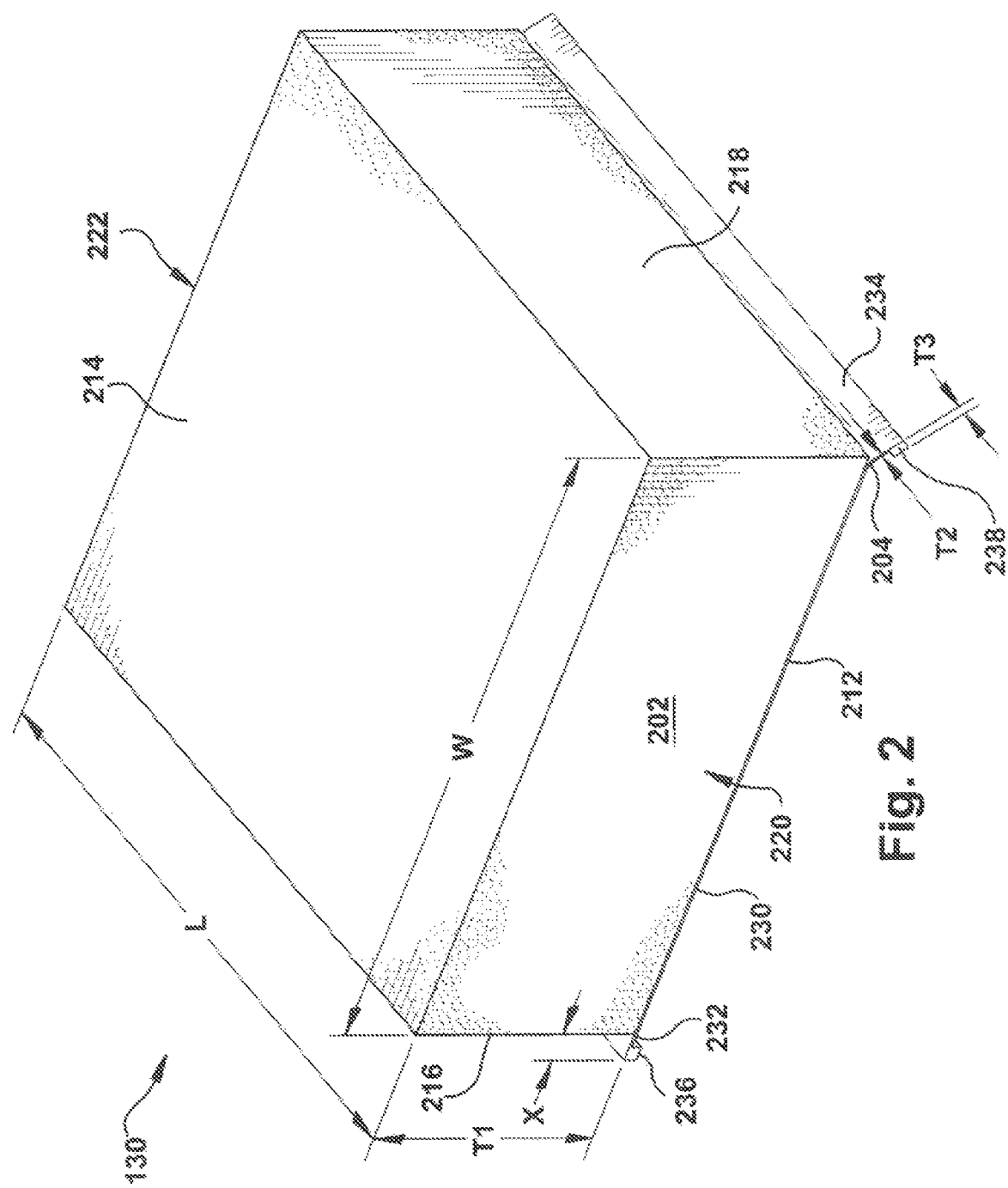
FIG. 2 is a perspective view of the insulation member of FIG. 1.

An insulation member 130 is installed in the space or cavity formed between two of the structural framing members 106. FIG. 2 illustrates an exemplary embodiment of the insulation member 130. The insulation member 130 includes an insulation body 202 and an insulation facing 204. The insulation body 202 can be made from a wide variety of different materials and can take a wide variety of different forms. Any shape and size suitable for installation between structural framing members may be used. In one exemplary embodiment, the insulation body 202 is made from a fibrous material. For example, the insulation body 202 may comprise fiberglass insulation, such as a bonded blanket of short glass fibers, a bonded blanket of long glass fibers, or organic and/or inorganic fibers in a thermosetting or thermoplastics resin formed into flexible rolls or batts. In the exemplary embodiment, the insulation body 202 includes resilient fibrous insulation formed in a generally box-like shape.

The insulation body 202 has a length L, a width W and a thickness T1. The insulation body 202 includes a first face 212 and a second face 214 that is opposite of and parallel to, or substantially parallel to, the first face. Each of the first face 212 and the second face 214 extend the length L and width W of the insulation body 202. The insulation body 202 includes a first lateral surface 216 and a second lateral surface 218 that is opposite of and parallel to, or substantially parallel to, the first lateral surface. Each of the first lateral surface 216 and the second lateral surface 218 extend for the length L of the insulation body 202 and extend between the first face 212 and the second face 214. The insulation body 202 includes a first end surface 220 and a second end surface 222 opposite of and parallel to, or substantially parallel to, the first end surface. The first end surface 220 and the second end surface 222 extend the width W of the insulation body 202 and extend between the first face 212 and the second face 214.

The insulation facing 204 may serve as a vapor retarder, radiant heat barrier, or other functional barrier. The insulation facing 204 may also be utilized to support the insulation member in position between the structural framing members 106a, 106b and to facilitate proper installation of the insulation member 130 between the framing members. The insulation facing 204 can take a wide variety of different forms. For example, the facing 204 may be a single sheet of material or several layers of material. In the exemplary embodiment, the insulation facing 204 includes a relatively thin sheet having a first portion 230 that is attached to at least a portion of the first face 212.

The facing 204 can be attached to the insulation body 202 in a wide variety of different ways. For example, the facing 204 can be adhered to the insulation body 202 with an adhesive. A wide variety of different adhesives can be used to adhere the facing 204 to the insulation body 202. For example, the adhesive can be a water base adhesive, a one part adhesive, a two part adhesive, a powder adhesive, a hot melt adhesive, thin film adhesives, a binder, such as a formaldehyde free binder and a spunbond hot melt adhesive web. The adhesive may be applied in a wide variety of different ways. The adhesive may be applied to the insulation body 202 and/or the facing 204, for example by spraying, rolling, brushing, etc. When a binder is used, the binder may be a binder that is part of the insulation body 202 and/or the facing 204 and curing of the binder adheres the insulation body 202 to the facing 204.

The facing 204 may be made from a wide variety of different materials. For example, the facing 204 may comprise one or more of nonwoven fiberglass and polymeric media, woven fiberglass and polymeric media, sheathing materials, such as sheathing films made from polymeric materials, scrim, cloth, fabric, foil, tapes, kraft paper or material, and fiberglass reinforced kraft paper (FRK). In one exemplary embodiment, the facing 204 is suitable for a fibrous insulation product.

The facing also includes a second portion 232 that extends beyond the first lateral surface 216, and a third portion 234 that extends beyond the second lateral surface 218. In other embodiments, however, the facing is not adhered to the insulation body 202. In the exemplary embodiment, the first portion 230 of the facing 204 extends the length L and the width W of the insulation body 202, the second portion 232 extends beyond the first lateral surface 218 along the length L of the insulation body, and the third portion 234 extends beyond the second lateral surface 118 along the length L of the insulation body. In other embodiments, however, the first portion 230, the second portion 232, and the third portion 234 may extend less or more than the length L. In an exemplary embodiment, the second portion 232 and the third portion 234 include free edges of the facing that are not attached to the insulation member.

The second portion 232 and the third portion 234 may be used to secure the insulation body 202 in place between structural framing members 106. The second portion 232 includes a first flange guide 236 and the third portion 234 includes a second flange guide 238. The first flange guide 236 and the second flange guide 238 may be configured in a variety of ways, including different shapes and materials. Any shape and material that can interact with a structure on a mechanism, such as a stapler or nailer, for attaching the facing 202 to a structural framing member 106 may be used. For example, the first flange guide 236 may be integral to the second portion 232 or may be separate and attached to the second portion.

The first flange guide 236 may be located at any suitable location on the second portion, such as for example, at a terminal end of the second portion or at an intermediate position between a terminal end and the first lateral surface 216. In the exemplary embodiment, the first flange guide 236 is located on the second portion 232 a distance X from the first lateral surface 216. In one exemplary embodiment, the first flange guide 236 is located on the second portion 232 in the range of 0.1875 inch to 1.0 inch, or about 0.1875 inch to about 1 inch, from the first lateral surface 216. The first flange guide 236 may extend at least the entire length L of the insulation body 202 or may extend less than the entire length. In an exemplary embodiment, the first flange guide 236 extends at least a majority of the length L of the insulation body 202. In another exemplary embodiment, the first flange guide 236 extends the entire length L, or substantially the entire length L, of the insulation body 202. The first flange guide 236 may be extend continuously along the length L of the body or may extend intermittently.

The first flange guide 236 may be made from the same material as the facing 204 or may be a different material. The first flange guide 236 may have a wide variety of different profiles including various shapes and sizes. For example, the flange guide may be shaped as a male or female connection or may be formed by folding the facing into multiple layers. The first flange guide 236 may include a separate material, such as for example, a plastic ridge or tube adhered to, folded into, or otherwise attached to or integrated with the second portion 232. In the exemplary embodiment of FIG. 2, the first flange guide 236 has a rectangular, or substantially rectangular, cross section configuration and extends the entire length L of the insulation body 202.

The facing 204 has a thickness T2 and the first flange guide 236 has a thickness T3 that is greater than the thickness T2 of the facing 204. In the exemplary embodiment, the second flange guide 238 and the third portion 234 are the same as, or similar to, the first flange guide 236 and the second portion 232. Therefore, the description regarding the first flange guide 236 and the second portion 232 applies equally to the second flange guide 238 and the third portion 234.

Figure 3:
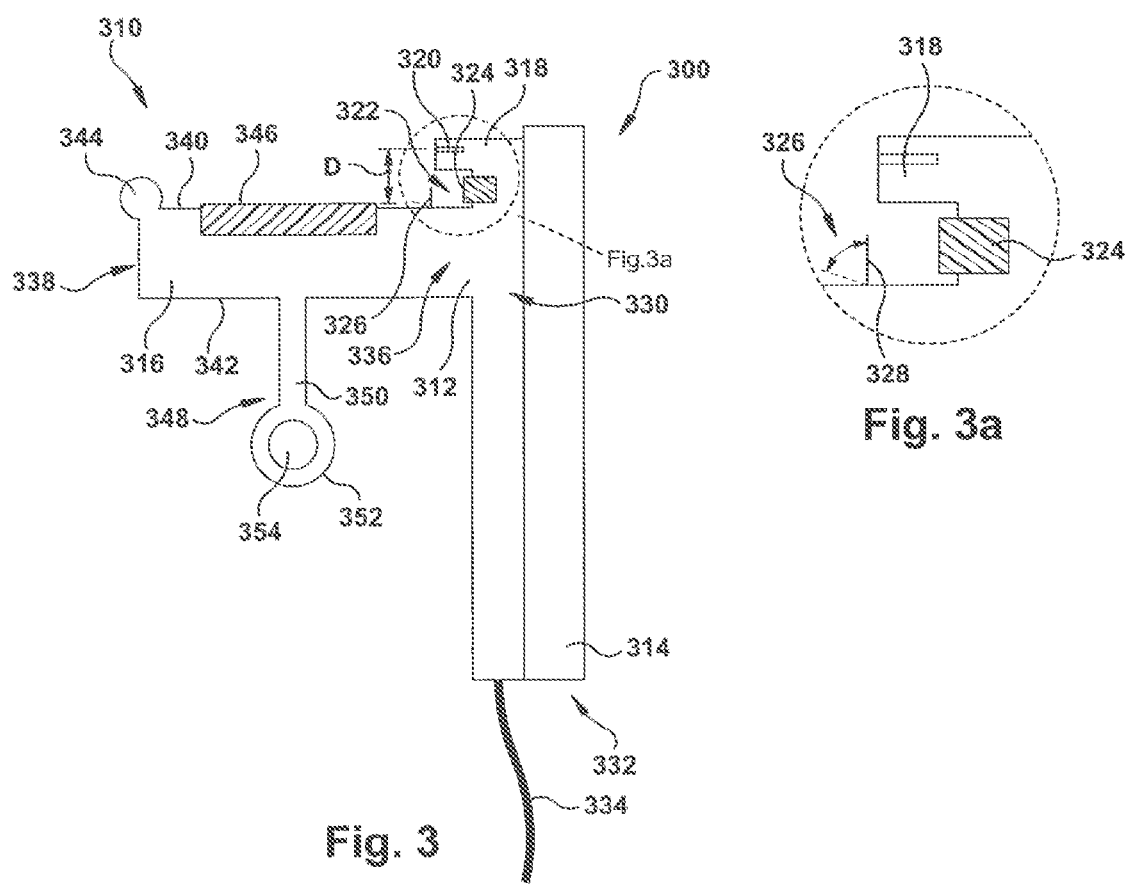
FIG. 3 is a top view of an exemplary embodiment of a mechanism for installing the insulation member of FIG. 1 between structural framing members.

The first flange guide 236 and the second portion 232 and the second flange guide 238 and the third portion 234 are designed to mate with a structure on a mechanism designed to secure the insulation member 130 to the structural framing members 106. FIG. 3 illustrates an exemplary embodiment of a mechanism 300 for securing insulation between structural framing members. The mechanism 300 may be configured in a variety of ways. Any mechanism 300 that may cooperate with the first and second flange guides 236, 238 to secure the insulation member 130 to a structural framing member 106 and facilitate proper installation of the insulation member may be used. For example, the mechanism 300 may be a stapler, nailer or other suitable mechanism that secures the insulation member to a structural framing member with one or more fasteners, such as, for example, staples or nails. In the exemplary embodiment of FIG. 3, the mechanism 300 is realized as an inset stapler 310 designed to staple against the inside side surface of the structural framing members, such as for example, the first side surface 112 of the first structural framing member 106a.

The inset stapler 310 may function similar to a conventional stapler in that the stapler may house a supply of staples and include a stapling mechanism capable of firing a staple into an object when actuated. In the exemplary embodiment of FIG. 3, the inset stapler 310 has a generally L-shaped body 312 including a first leg 314 and a second leg 316 perpendicular to, or generally perpendicular to, the first leg. The inset stapler 310 also includes a stapling portion 318 forward of the first leg 314 and second leg 316. In other embodiments, however, the inset stapler 310 may be other than L-shaped.

The stapling portion 318 houses a stapling mechanism 320. The stapling mechanism 320 may be configured in a variety of ways. Any mechanism capable of firing a staple into an object when actuated may be used. For example, the stapling mechanism 320 may be a conventional stapling mechanism used in commercial and industrial staplers. In the exemplary embodiment, the stapling mechanism 320 is powered by a suitable power source (not shown). For example, the stapling mechanism may be powered electrically, pneumatically, or by some other suitable power source. In other embodiments, however, the stapling mechanism 320 may be manually powered. The stapling mechanism is orientated to fire a staple in a direction generally perpendicular to the first leg 314 and at a fixed distance D from the inner face 108 of the structural framing members. In one exemplary embodiment, stapling mechanism is orientated to fire a staple in the range of 0.1875 inch to 1.0 inch, or about 0.1875 inch to about 1 inch, from the inner face 108 of the structural framing members.

The stapling portion 318 includes structure for cooperating with a guide on an insulation member, such as for example the flange guides 236, 238 on the facing 204. The structure for engaging a guide may be configured in a variety of ways. Any structure capable of cooperating with the guide to facilitate proper insulation of the insulation member may be used. In the exemplary embodiment, the structure is a channel 322 with a shape that is complimentary to the first flange guide 236 such that the first flange guide may be received within the channel. In the exemplary embodiment, the channel 322 has a generally rectangular shape matching the generally rectangular shape of the first flange guide 236.

The channel 322 may include one or more glide surfaces 324 designed to reduce friction from relative movement between the first flange guide 236 and the channel 322. The one or more glide surfaces 324 may be configured in a variety of ways. Any surface capable of reducing friction between the first flange guide 236 and the channel 322 during movement relative to each other may be used. For example, the one or more glide surfaces 324 may be one or more low friction surfaces either formed by a low friction material, coated with a low friction coating, or formed in a manner to reduce friction (e.g. polished surface). The one or more glide surfaces 324 may also include one or more movable surfaces, such as a wheel, bearing or other movable surface configured to reduce friction between the guide and channel.

As shown in FIG. 3a, the stapling portion 318 may optionally include one or more retention structures 326 designed to retain the first flange guide 236 in the channel 322 during use. The retention structures 326 may be configured in a variety of ways. Any structure capable of retaining the first flange guide 236 in the channel 322 during use while still allowing relative movement between the first flange guide and the channel may be used. In the illustrated embodiment, the one or more retention structures 326 include a movable bracket 328 adjacent the channel 322. The bracket 328 is pivotably between an active position in which the facing 204 is sandwiched between the bracket and the stapling portion 318 and an inactive position in which the bracket is pivoted away from the channel 322. The bracket 328 is configured to remain in the active position until moved to the inactive position by the user. For example, the bracket 328 may be biased to the active position by a biasing member (not shown), such as for example a spring, or may be retained in the active position by a detent or other structure. In other embodiments, however, the bracket may move between the active and inactive positions other than by pivoting, such as by sliding, rotating, or other movement.

The first leg 314 may be configured in a variety of ways. In the exemplary embodiment, the first leg 314 has a first end 330 that connects to the second leg 316 and a second end 332 distal from the first end. In the exemplary embodiment, the first leg 314 includes a hollow interior section that is configured to house a plurality of staples and a mechanism, such as a spring loaded plunger, capable of feeding the staples to the stapling mechanism 320. The first leg 314 may also house a power supply, such as for example, a battery, or may be arranged to route power to the stapling mechanism 320 from an external power supply via one or more lines or wires 334. In the illustrated embodiment, one or more power lines or wires 334 are routed through the second end 332, through the interior of the first leg 314 to the stapling mechanism 320. In other embodiments, however, the stapling mechanism may receive power other than by lines or wires routed through the first leg 314. The first leg 314 may also serve as handle for the user to grasp the inset stapler 310 during use.

The second leg 316 may be configured in a variety of ways. In the exemplary embodiment, the second leg 316 includes a first end 336 that connects to the first leg 314, a second end 338 opposite the first end, a first side 340 extending between the first leg and the second leg, and a second side 342 opposite the first side and extending between the first leg and the second leg. The second end 338 may optionally include a forward extending protrusion 344 designed to bracket a framing member 106 opposite the stapling portion 318. The protrusion 344 may be configured in a variety of ways. Any protrusion 344 capable of aiding the positioning of the inset stapler 310 on the framing member 106 may be used. In the illustrated embodiment, the protrusion 344 has a circular, or generally circular, cross section. In other embodiments, however, the protrusion may be shaped other than circular.

The first side 340 is designed to abut the inner face of a framing member during use, such as for example, the inner face 108 of the first framing member 106a. The first side 340 may include one or more glide surface 346 for engaging the framing member 106. The one or more glide surfaces 346 may be configured in a variety of ways. Any surface capable of reducing friction between the second leg 316 and the framing member 106 during relative movement between the two may be used. For example, the one or more glide surfaces 346 may be one or more low friction surfaces either formed by a low friction material, coated with a low friction coating, or formed in a manner to reduce friction (e.g. polished surface). The one or more glide surfaces 346 may also include one or more movable surfaces, such as a wheel, bearing or other movable surface configured to reduce friction between the second leg 316 and the first framing member 106a.

The second leg 316 may also include a handle 348 which the user may grasp to support the stapler 310 during use. The handle 348 may be configured in a variety of ways and located in a variety of positioned on the stapler 310. In the illustrated embodiment, the handle 348 extends outward from the second side 342 and includes a stem 350 and a knob 352 at a distal end of the stem. The handle 348 may be equipped with an interface 354 for actuating the stapler 310. For example, the interface 354 may be a push button or trigger positioned to allow the user to actuate the stapler 310 while holding the stapler in position. In other embodiments, however, an interface 354 may be any suitable configuration and located on any suitable portion of the stapler, such as for example, the first leg 314.

During installation, the insulation member 130 is positioned between two adjacent framing members 106a, 106b such that the first lateral surface 216 is adjacent the first side surface 112 of the first framing member 106a, the second lateral surface 218 is adjacent the second side surface 118 of the second framing member 106b, and the first face 212 is generally parallel to, or parallel to, the first inner face 108 and the second inner face 114 of the first and second framing members 106a, 106b, respectively. The first flange guide 236 is inserted into the channel 322 of the stapler 310. For example, the bracket 326 may be moved to the inactive position thus opening the channel 322 so that the first flange guide 236 may be inserted into the channel. Once the first flange guide 236 is inserted in the channel 322, the bracket 326 may be moved to the active position to retain the first flange guide in the channel.

Figure 4:
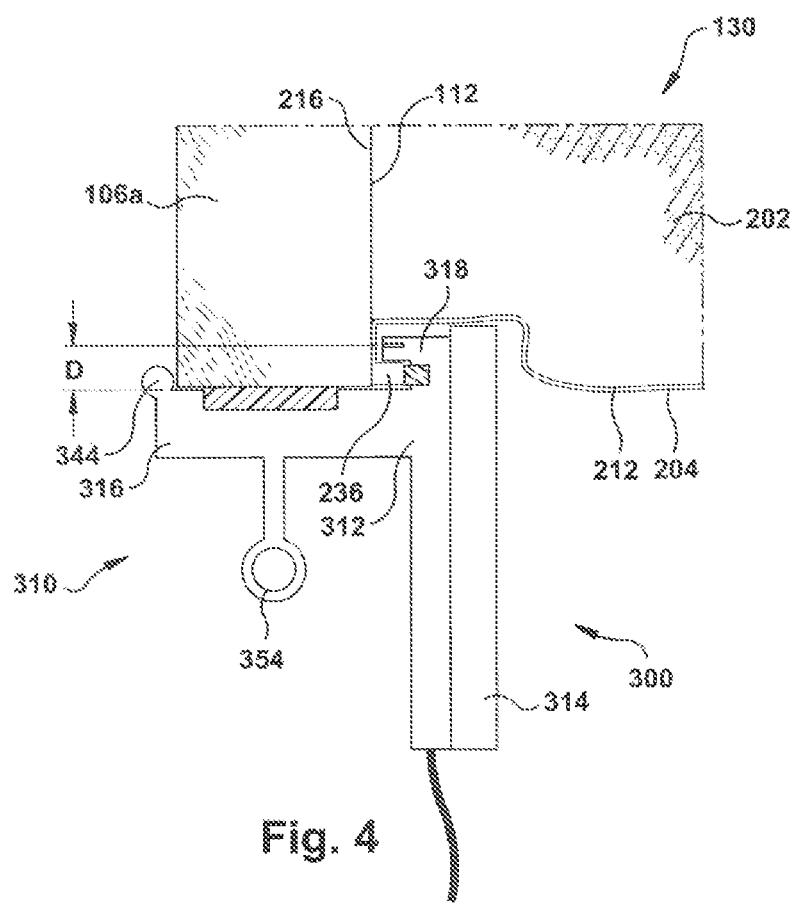
FIG. 4 is a partial top view of the mechanism of FIG. 3 securing the insulation member of FIG. 1 between structural framing members.

The stapler 310 may then be aligned with the first framing member 106a, as shown in FIG. 4. Specifically, the one or more glide surfaces 346 on the first side 340 of the second leg 316 are placed against the inner face 108 of the first framing member 106a such that the protrusion 344 is adjacent the second side surface 113 and the stapling portion 318 is adjacent the first side surface 112. In this position, the second portion 232 of the facing 204 is positioned between the first side surface 112 and the stapling mechanism 320 and the stapling mechanism is inset the distance D from the inner face 108. Thus, the second portion 232 of the facing 204, the first framing member 106a, and the stapling mechanism 320 are aligned and positioned for proper installation of the insulation member (i.e. installation that avoids deep inset stapling).

When actuated, such as for example, by the user actuating the interface 354, the stapling mechanism 320 fires a staple through the second portion 232 of the facing 204 and into the first side surface 112 of the first framing member 106a. In one exemplary embodiment, the stapling mechanism 320 fires a staple through the first flange guide 236 and into the first side surface 112. In another exemplary embodiment, the stapling mechanism 320 fires a staple through a stapling zone, which is defined as a portion of the second portion 232 not containing the first flange guide 236.

To complete attaching the second portion 232 of the facing 204 to the first framing member 106a, the stapler 310 is moved vertically, upward or downward, along the inner face 108 of the first framing member 106a. The first flange guide 236 will be funneled through the channel 322 as the stapler 310 moves relative to the first flange guide, thus maintaining proper alignment of the second portion 232 of the facing 204, the first framing member 106a, and the stapling mechanism 320. The one or more glide surfaces 346 on the first side 340 allow the stapler 310 to slide smoothly along the inner face 114 and the one or more glide surfaces 324 allow the first flange guide 236 to slide smoothly within the channel 322.

The user may fire staples at intervals through the facing 204 as the stapler 310 moves along the first framing member 106a. Alternatively, the stapler 310 may be equipped with a mechanism for automatically firing staples at predetermined intervals. For example, if the one or more glide surfaces 346 on the second leg 316 include a roller or other rotating member, the roller may be configured to actuate the stapler after rotating a set number of degrees or rotations, such that the user need not actuate the interface 354 for every staple.

Thus, the user may attach the stapler 310 to the first flange guide 236 at or near an end of the first framing member 106a or first flange guide 236. The user may then quickly staple along the length of the second portion 232 of the facing 204 by sliding the stapler 310 along the length of the inner face 108 of the first framing member 106a while firing staples at intervals along the length, thus resembling a zipper or zipping process. Once complete, the stapler 310 can be disengaged from the first flange guide 236 and the process can be repeated to the second flange guide 238, the third portion 234, and the second framing member 106b. The stapler 310 can be rotated 180 degrees so that the stapling mechanism 320 is facing the inner face 118 of the second framing member 106b and the second flange guide 238 can be inserted in the channel 322 similar to the way the first flange guide 236 was.

Figure 5:
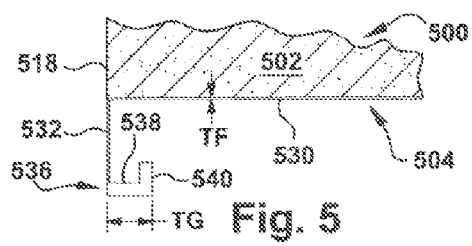
FIG. 5 is a partial top view of an exemplary embodiment of an insulation guide on an insulation member.

FIGS. 5-10 illustrate schematic representations of various non-limiting exemplary embodiments of flange guides. FIG. 5 illustrates an insulation member 500 having a facing 504 attached to an insulation body 502. The facing 504 is similar to the facing 204 of FIG. 2 in that it includes a first portion 530 that extends the length and the width of the insulation body 502 and a second portion 532 that extends beyond a first lateral surface 518 of the insulation body. The second portion 532 may be used to secure the insulation body 502 in place between structural framing members 106 during installation and includes a first flange guide 536. The facing 504 has a thickness TF and the first flange guide 536 has a thickness TG that is greater than the thickness of the facing 504.

The first flange guide 536, however, differs from the exemplary embodiment of the first flange guide 236 of the facing 204. In particular, the first flange guide 536 has an L-shaped, or substantially L-shaped, cross section configuration and extends the length of the second portion 532. The L-shaped configuration includes a first leg 538 extending perpendicularly, or generally perpendicularly, outward from the facing 504, and a second leg 540 extending perpendicularly, or generally perpendicularly, outward from the first leg. The first flange guide 536 may, for example, mate with a corresponding channel in a mechanism for securing the insulation member 500 to the structural framing members 106 similarly to as described in relation to insulation member 130 and mechanism 300. The L-shape, when matched with a corresponding L-shaped channel on the mechanism, such a stapler, will help retain the first flange guide in the channel during installation of the insulation member 130 (i.e. the L-shape acts as a hook to resist the first flange guide falling out of the channel).

Figure 6:
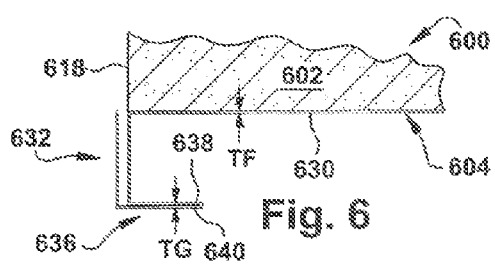
FIG. 6 is a partial top view of another exemplary embodiment of an insulation guide on an insulation member.

FIG. 6 illustrates an insulation member 600 having a facing 604 attached to an insulation body 602. The facing 604 is similar to the facing 204 of FIG. 2 in that it includes a first portion 630 that extends the length and the width of the insulation body 602 and a second portion 632 that extends beyond a first lateral surface 618 of the insulation body 602. The second portion 632 may be used to secure the insulation body 602 in place between structural framing members 106 during installation and includes a first flange guide 636. The facing 604 has a thickness TF and the first flange guide 636 has a thickness TG that is greater than the thickness of the facing 604.

The first flange guide 636, however, differs from the exemplary embodiment of the first flange guide 236 of the facing 204. In particular, the first flange guide 636 includes a first layer 638 and a second layer 640 adjacent the first layer. In one exemplary embodiment, the first layer 638 and the second layer 640 are formed from folding the facing 604 over upon itself. Thus, first flange guide 636 is formed from a single piece of material folded over and has the thickness TG that is twice the thickness TF of the facing 604. In other embodiments, however, the first layer 638 and the second layer 640 may be two separate layers and also need not be formed from two layers of the facing 604. The first flange guide 636 may be engaged by a mechanism, such as a stapler, for securing the insulation member 600 to the structural framing members 106. The first flange guide 636 may, for example, mate with a corresponding channel in a mechanism for securing the insulation member 600 to the structural framing members 106 similarly to as described in relation to insulation member 130 and mechanism 300.

Figure 7:
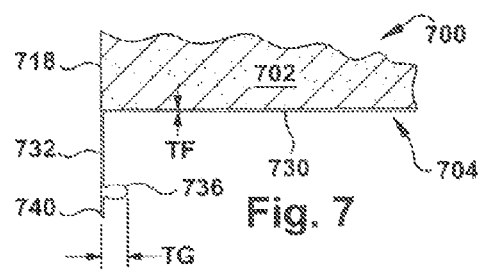
FIG. 7 is a partial top view of another exemplary embodiment of an insulation guide on an insulation member.

FIG. 7 illustrates an insulation member 700 having a facing 704 attached to an insulation body 702. The facing 704 is similar to the facing 204 of FIG. 2 in that it includes a first portion 730 that extends the length and the width of the insulation body 702 and a second portion 732 that extends beyond a first lateral surface 718 of the insulation body 702. The second portion 732 may be used to secure the insulation body 702 in place between structural framing members 106 during installation and includes a first flange guide 736. The facing 704 has a thickness TF and the first flange guide 736 has a thickness TG that is greater than the thickness of the facing 704.

The first flange guide 736, however, differs from the exemplary embodiment of the first flange guide 236 of the facing 204. In particular, the first flange guide 736 has an oval, circular, or elliptical cross-section, and unlike the illustrated embodiment of the first flange guide 236, which is positioned at a terminal end of the second portion 232, the first flange guide 736 is positioned inward from a terminal end 740 of the second portion. The first flange guide 736 may be formed in a variety of ways, such as for example as a localized fold in the facing 704 or by embedding, attaching, wrapping, or otherwise attaching a thread, tube, or other profile into the facing. The first flange guide 736 may be engaged by a mechanism, such as a stapler, for securing the insulation member 700 to the structural framing members 106. The first flange guide 736 may, for example, mate with a corresponding channel in a mechanism for securing the insulation member 700 to the structural framing members 106 similarly to as described in relation to insulation member 130 and mechanism 300.

Figure 8:
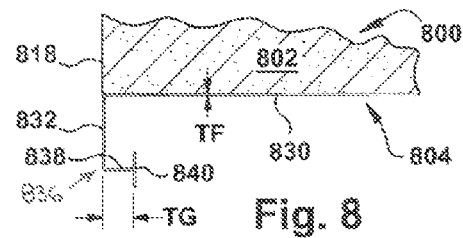
FIG. 8 is a partial top view of another exemplary embodiment of an insulation guide on an insulation member.

FIG. 8 illustrates an insulation member 800 having a facing 804 attached to an insulation body 802. The facing 804 is similar to the facing 204 of FIG. 2 in that it includes a first portion 830 that extends the length and the width of the insulation body 802 and a second portion 832 that extends beyond a first lateral surface 818 of the insulation body 802. The second portion 832 may be used to secure the insulation body 802 in place between structural framing members 106 during installation and includes a first flange guide 836. The facing 804 has a thickness TF and the first flange guide 836 has a thickness TG that is greater than the thickness of the facing 804.

The first flange guide 836, however, differs from the exemplary embodiment of the first flange guide 236 of the facing 204. In particular, the first flange guide 836 is generally T-shaped having a stem portion 838 extending perpendicular, or generally perpendicular, outward from the facing 804 and a head portion 840 extending perpendicular, or generally perpendicular, outward from the stem portion 838 in opposite directions. The first flange guide 836 may, for example, mate with a corresponding channel in a mechanism for securing the insulation member 800 to the structural framing members 106 similarly to as described in relation to insulation member 130 and mechanism 300.

Figure 9:
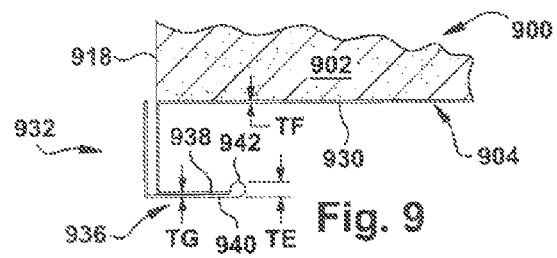
FIG. 9 is a partial top view of another exemplary embodiment of an insulation guide on an insulation member.

FIG. 9 illustrates an insulation member 900 having a facing 904 attached to an insulation body 902. The facing 904 is similar to the facing 204 of FIG. 2 in that it includes a first portion 930 that extends the length and the width of the insulation body 902 and a second portion 932 that extends beyond a first lateral surface 918 of the insulation body 902. The second portion 932 may be used to secure the insulation body 902 in place between structural framing members 106 during installation and includes a first flange guide 936. The facing 904 has a thickness TF and the first flange guide 936 has a thickness TG that is greater than the thickness of the facing 904.

The first flange guide 936, however, differs from the exemplary embodiment the first flange guide 236 of the facing 204 of FIG. 2. In particular, the first flange guide 936 includes a first layer 938 and a second layer 940 adjacent the first layer. In one exemplary embodiment, the first layer 938 and the second layer 940 are formed from folding the facing 904 over upon itself. Thus, first flange guide 936 is formed from a single piece of material folded over and has the thickness TG that is twice the thickness TF of the facing 904. In other embodiments, however, the first layer 938 and the second layer 940 may be two separate layers and also need not be formed from two layers of the facing 904. The first flange guide 936 may also include an enlarged cross-section portion 942. The enlarged portion 942 may have any suitable cross-sectional shape, such as for example an oval, circular, or elliptical cross-section. The enlarged cross-section portion 942 may be formed in a variety of ways, such as for example as a localized fold in the facing 904 or by embedding, attaching, wrapping a thread, tube, or other profile into the facing. The enlarged cross-section portion 942 has a thickness TE that is greater than the thickness TG of the non-enlarged portion of the first flange guide 936.

The first flange guide 936 may be engaged by a mechanism, such as a stapler, for securing the insulation member 900 to the structural framing members 106. The first flange guide 936 may, for example, mate with a corresponding channel in a mechanism for securing the insulation member 900 to the structural framing members 106 similarly to as described in relation to insulation member 130 and mechanism 300.

Figure 10:
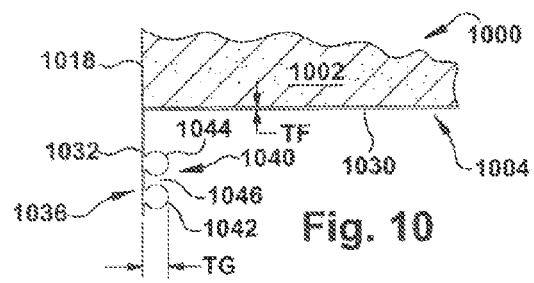
FIG. 10 is a partial top view of another exemplary embodiment of an insulation guide on an insulation member.

FIG. 10 illustrates an insulation member 1000 having a facing 1004 attached to an insulation body 1002. The facing 1004 is similar to the facing 204 of FIG. 2 in that it includes a first portion 1030 that extends the length and the width of the insulation body 1002 and a second portion 1032 that extends beyond a first lateral surface 1018 of the insulation body 1002. The second portion 1032 may be used to secure the insulation body 1002 in place between structural framing members 106 during installation and includes a first flange guide 1036. The facing 1004 has a thickness TF and the first flange guide 1036 has a thickness TG that is greater than the thickness of the facing 1004.

The first flange guide 1036, however, differs from the exemplary embodiment the first flange guide 236 of the facing 204. In particular, the first flange guide 1036 includes structure for receiving corresponding structure of a mechanism for securing the insulation member 1000 to the structural framing members 106. Thus, instead of the mechanism having a channel to receive the first flange guide 1036, the first flange guide has structure for receiving corresponding structure, such as for example, a projection, on the mechanism. The structure of the first flange guide and corresponding structure of the mechanism may be configured in a variety of ways. Any structure capable of interacting with structure on the mechanism for attaching the facing 1002 to a structural framing member 106 may be used.

In the exemplary embodiment, the first flange guide 1036 includes a first projection 1042 extending from the facing 1004 and a second projection 1044 extending from the facing spaced apart from and parallel, or generally parallel, to the first projection. The first projection 1042 and the second projection 1044 form a channel 1046 there between for receiving a structure, such as a projection, on the mechanism. In the exemplary embodiment, the first and second projection 1042, 1044 may have any suitable cross-sectional shape, such as for example an oval, circular, or elliptical cross-section. The first and second projection 1042, 1044 may be formed in a variety of ways, such as for example as localized folds in the facing 1004 or by embedding, attaching, wrapping a thread, tube, or other profile into the facing. The channel 1046 is configured to allow the structure of the mechanism to be received in the channel (e.g. snapped into the channel) and held in place while the mechanism moves along the guide during installation similar to as described in relation to insulation member 130 and mechanism 300.

Figure 11:
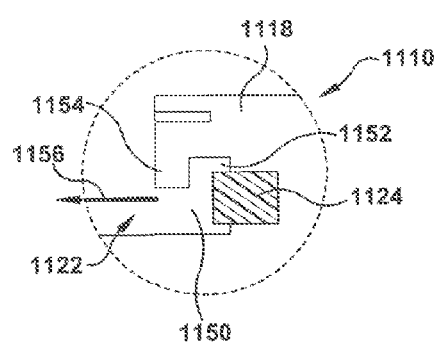
FIG. 11 is an enlarged view of an exemplary embodiment of a channel portion of a mechanism for installing an insulation member between structural framing members.

FIG. 11 illustrates an exemplary embodiment of a stapling portion 1118 for a inset stapler 1110. The inset stapler 1110 is similar to the inset stapler 310 of FIGS. 3 and 3*a* including the stapling portion 1118 having a channel 1122 with a shape that is complimentary to a flange guide on the facing of an insulation. In the exemplary embodiment of FIG. 11, the channel 1122 is shaped to compliment the first flange guide 536 of FIG. 5. Thus, the channel 1122 is L-shaped, or generally L-shaped, including a first channel portion 1150 designed to receive the first leg 538 of the first flange guide 536 and a second channel portion 1152 designed to receive the second leg 540 of the first flange guide. The stapling portion 1118 includes a projection 1154 the extends into the channel 1122 to form the L-shape. When the first flange guide 536 is properly positioned within the channel 1122, the projection 1154 cooperates with the second leg 540 to resist movement of the first flange guide 536 out of the channel in the direction shown by arrow 1156 in FIG. 11. The stapling portion 1118 may also include one or more glide surfaces 1124 designed to reduce friction from relative movement between the first flange guide 536 and the channel 1122.

Figure 12:
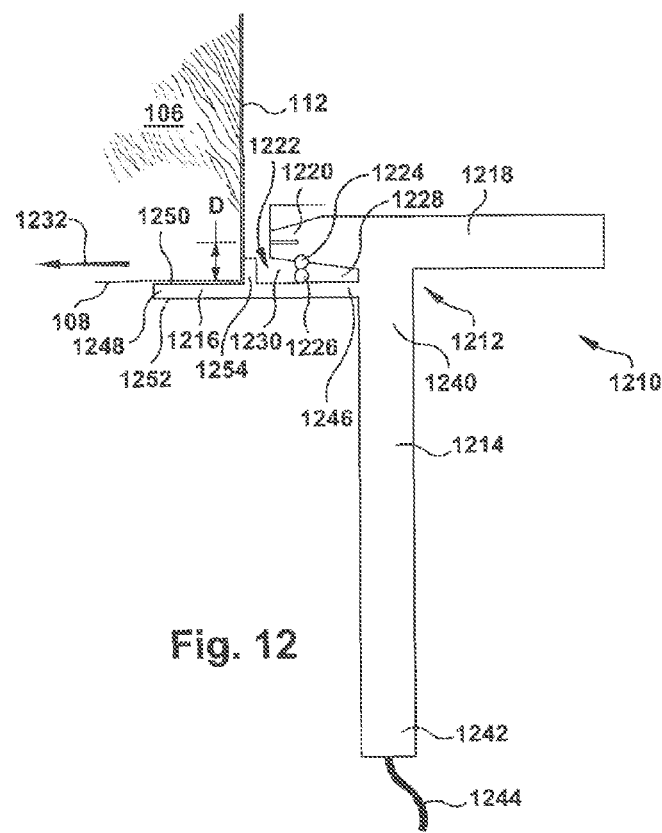
FIG. 12 is a top view of an exemplary embodiment of a mechanism for installing an insulation member between structural framing members.

FIG. 12 illustrates exemplary embodiment of an inset stapler 1210 for securing the insulation member 130 to the structural framing members 106. The inset stapler 1210 may function similar to a stapler 310 of FIG. 1 in that the stapler may house a supply of staples and include a stapling mechanism capable of firing a staple into an object when actuated by a user. In the exemplary embodiment of FIG. 12, the inset stapler 1210 has a generally T-shaped body 1212 including a first leg 1214, a second leg 1216 perpendicular to, or generally perpendicular to, the first leg, and a stapling portion 1218 perpendicular to, or generally perpendicular to, the first leg and extending in the opposite direction as the second leg 1216.

The stapling portion 1218 houses a stapling mechanism 1220 capable of firing a staple into an object when actuated by a user may be used. In the exemplary embodiment, the stapling mechanism 1220 is powered by a suitable power source. In other embodiments, however, the stapling mechanism 1220 may be manually powered. The stapling mechanism is orientated to fire a staple in a direction generally perpendicular to the first leg 1214 and at a fixed distance D from the outer face 108 of the structural framing member 106.

The stapling portion 1218 includes structure for cooperating with a flange guide on an insulation member. The structure for engaging a flange guide may be configured in a variety of ways. Any structure capable of cooperating with the flange guide to facilitate proper insulation of the insulation member may be used. In the exemplary embodiment, the structure is a channel 1222 with one or more retention features designed to retain a flange guide on the facing of an insulation member within the channel. The one or more retention features may be configured in a variety of ways. In the illustrated embodiment, the one or more retention features includes a first projection 1224 and a second projection 1226 adjacent the first projection. The first and second projection 1224, 1226 are illustrated as having circular, or generally circular, cross-sections. In other embodiments, however, the first and second projection 1224, 1226 may be shaped other than circular.

The first projection 1224 and the second projection 1226 are designed to cooperate with a flange guide similar to the flange guide 936 of FIG. 9. In particular, the channel 1222 includes an inward portion 1228 and an outward portion 1230 separated by the first projection 1224 and the second projection 1226. In operation, the enlarged portion 942 is positioned in the inward portion 1228 and the second portion 932 of the facing 904 extends between the first projection 1224 and the second projection 1226, into the outward portion 1230 of the channel, and between the stapling mechanism 1220 and the first side surface 112 of the framing member 106. The thickness TE of the enlarged portion 942 is larger than the gap between the first projection 1224 and the second projection 1226. Thus, the first projection 1224 and the second projection 1226 retain the flange guide 936 within the channel 1230. In some embodiments, the first projection 1224 and the second projection 1226 may be moveable between a first position in which they block the flange guide 936 from being removed from the channel 1230 in the direction of arrow 1232 and a second position in which they allow the flange guide to be removed from the channel.

The first projection 1224 and the second projection 1226 may be formed from a low friction material, coated with a low friction coating, or formed in a manner to reduce friction (e.g. polished surface) from relative movement between the first flange guide 936 and the first projection 1224 and the second projection 1226. The channel 1222 may also include one or more glide surfaces (not show) configured to reduce friction from relative movement between the first flange guide 936 and channel 1222.

The first leg 1214 may be configured in a variety of ways. In the exemplary embodiment, the first leg 1214 has a first end 1240 that connects to the second leg 1216 and a second end 1242 distal from the first end. In the exemplary embodiment, the first leg 1214 includes a hollow interior section that is configured to house a plurality of staples and a mechanism, such as a spring loaded plunger, capable of feeding the staples to the stapling mechanism 1220. The first leg 1214 may also house a power supply, such as for example, a battery or be arranged to route power to the stapling mechanism 1220 from a power supply via one or more lines or wires 1244. In the illustrated embodiment, one or more lines or wires 1244 are routed through the second end 1242, through the interior of the first leg 1214 to the stapling mechanism 1220. The first leg 1214 may also serve as handle for the user to grasp the inset stapler 1210 during use.

The second leg 1216 may be configured in a variety of ways. In the exemplary embodiment, the second leg 1216 includes a first end 1246 that connects to the first leg 1214, a second end 1248 opposite the first end, a first side 1250 extending between the first leg and the second leg, and a second side 1252 opposite the first side and extending between the first leg and the second leg. The second leg 1216 may optionally include a forward extending protrusion 1254 designed to engage the first side surface 112 of the framing member 106. The first side 1250 is designed to abut the inner face 108 of the framing member 106 during use. The first side 1250 and the forward extending protrusion 1254 cooperate to properly align the stapler 1210, the framing member 106, and the facing 1204 during installation. In use, the stapler 1210 functions similarly to the stapler 310 of FIG. 3 in that the flange guide 936 is inserted in the channel 1230 of the stapler 1230 and the stapler is placed into engage with the framing member 106. The flange guide 936 and the stapler 1210 cooperate to properly align the facing 904 for attachment to the framing member 106. Once a first staple is fired through the facing 904 and into the framing member 106, the user slides the stapler 1210 along the height of the framing member and along the flange guide 936 while firing staples at a desired interval as the stapler moves relative to the flange guide.

Figure 13:
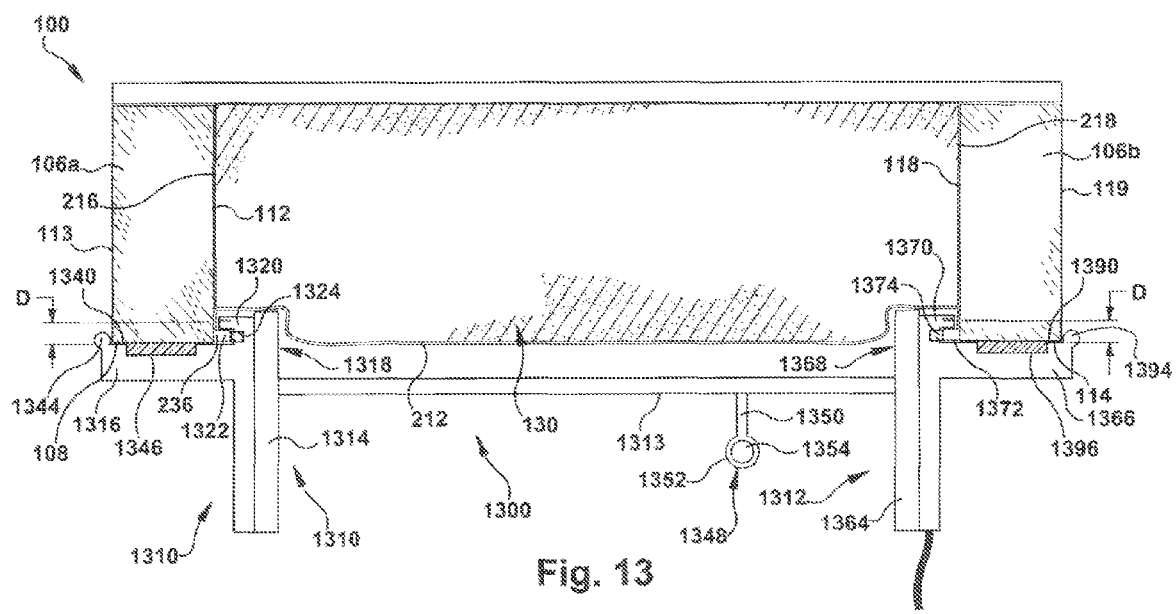
FIG. 13 is a top view of another exemplary embodiment of a mechanism for installing an insulation member between structural framing members.

FIG. 13 illustrates an exemplary embodiment of a mechanism 1300 designed to simultaneously attach both ends of an insulation member to two adjacent structural framing members. The mechanism 1300 can be configured in a variety of ways. Any configuration that allows the mechanism to simultaneously attach both ends of an insulation member to two adjacent structural framing members with the proper alignment and installation, may be used. In the exemplary embodiment, the mechanism 1300 includes a first stapler 1310 and a second stapler 1312 attached together by a rigid link 1313. Each of the first stapler 1310 and the second stapler 1312 may be similar to the stapler 310 of FIG. 3. In particular, the first stapler 1310 includes a first leg 1314, a second leg 1316 generally perpendicular to the first leg, and a stapling portion 1318 forward of the first leg and the second leg. The stapling portion 1318 houses a stapling mechanism 1320. The stapling mechanism 1320 is orientated to fire a staple in a direction generally perpendicular to the first leg 1314 and at a fixed distance D from the outer face 108 of the first structural framing member 106a. The stapling portion 1318 includes a channel 1322 with a shape that is complimentary to the first flange guide 236 such that the first flange guide may be received within the channel. The channel 1322 may include one or more glide surfaces 1324 designed to reduce friction from relative movement between the first flange guide 236 and the channel 1322.

The first leg 1314 may be configured to house a plurality of staples and a mechanism capable of feeding the staples to the stapling mechanism 1320 and may also serve as a handle for the user to grasp the stapler 1300 during use. The second leg 1316 includes a first side 1340 designed to abut the inner face 108 of the first framing member 106a during use. The first side 1340 may include one or more glide surfaces 1346 for engaging the first framing member 106a. The second leg 1316 may optionally include a forward extending protrusion 1344 designed to bracket the framing member 106a between the protrusion and the stapling portion 1320.

The stapler 1300 may also include a handle 1348 which the user may grasp to support the stapler during use. The handle 1348 may be configured in a variety of ways and located in a variety of positioned on the mechanism 1300. In the illustrated embodiment, the handle 1348 extends outward from the rigid crosslink 1313 and includes a stem 1350 and a knob 1352. The handle 1348 may be equipped with an interface 1354 for actuating the stapler 1300.

In the illustrated exemplary embodiment, the second stapler 1312 is configured the same as the first stapler 1310. In other embodiments, however, the second stapler 1312 may be configured differently than the first stapler 1310. In the exemplary embodiment, the second stapler 1312 includes a first leg 1364, a second leg 1366 generally perpendicular to the first leg, and a stapling portion 1368 forward of the first leg and the second leg. The stapling portion 1368 houses a stapling mechanism 1370. The stapling mechanism 1370 is orientated to fire a staple in a direction generally perpendicular to the first leg 1364 and at a fixed distance D from the outer face 108 of the first structural framing member 106a. The stapling portion 1368 includes a channel 1372 with a shape that is complimentary to the first flange guide 236 such that the first flange guide may be received within the channel. The channel 1372 may include one or more glide surfaces 1374 designed to reduce friction from relative movement between the first flange guide 236 and the channel 1322.

The first leg 1364 may be configured to house a plurality of staples and a mechanism capable of feeding the staples to the stapling mechanism 1370 and may also serve as a handle for the user to grasp the stapler 1300 during use. The second leg 1366 includes a first side 1390 designed to abut the inner face 108 of the first framing member 106a during use. The first side 1340 may include one or more glide surface 1396 for engaging the first framing member 106a. The second leg 1316 may optionally include a forward extending protrusion 1394 designed to bracket the framing member 106a between the protrusion and the stapling portion 1368.

During installation, the insulation member 130 is positioned between two adjacent framing members 106a, 106b such that the first lateral surface 216 is adjacent the first side surface 112 of the first framing member 106a, the second lateral surface 218 is adjacent the second side surface 118 of the second framing member 106b, and the first face 212 is generally parallel to, or parallel to, the first inner face 108 and the second inner face 114 of the first and second framing members 106a, 106b, respectively. The first flange guide 236 is inserted into the channel 1322 of the first stapler 1310 and the second flange guide 238 is inserted into the channel 1372 of the second stapler 1312.

The first stapler 1310 may then be aligned with the first framing member 106a and the second stapler 1312 may be aligned with the second framing member 106b. Specifically, the one or more glide surfaces 1346 on the first side 1340 of the first stapler 1310 are placed against the inner face 108 of the first framing member 106a such that the protrusion 1344 is adjacent the second side surface 113 and the stapling portion 1318 is adjacent the first side surface 112. Similarly, the one or more glide surfaces 1396 on the first side 1390 of the second stapler 1312 are placed against the inner face 114 of the second framing member 106b such that the protrusion 1394 is adjacent the second side surface 119 and the stapling portion 1368 is adjacent the first side surface 118.

In this position, the second portion 232 of the facing 204 (FIG. 1) is positioned between the first side surface 112 and the stapling mechanism 1320 of the first stapler 1310 and the third portion 234 of the facing 204 (FIG. 1) is positioned between the first side surface 118 and the stapling mechanism 1370 of the second stapler 1312. The stapling mechanism 1320 and the stapling mechanism 1370 are inset the distance D from the inner face 108 and the inner face 114, respectively. Thus, the facing 204, the first framing member 106a, the second framing member 106b, the stapling mechanism 1320, and the stapling mechanism 1370 are aligned and positioned for proper installation of the insulation member 130.

When the mechanism 1300 is actuated, such as for example, by the user actuating the interface 1354, the stapling mechanisms 1320, 1370 each fire a staple through the second portion 232 into the first side surface 112 of the first framing member 106a and through the third portion 234 into the first side surface 118 of the second framing member 106b, respectively. To complete attaching the insulation member 130 to the first framing members 106a, 106b, the mechanism 1300 is moved vertically, upward or downward, along both the inner face 108 of the first framing member 106a and inner face 114 of the second framing member 106b. The first flange guide 236 will be funneled through the channel 1322 and the second flange guide 238 will be funneled through the channel 1372 as the mechanism 1300 moves relative to the facing 204, thus maintaining proper alignment of the facing 204, the first and second framing member 106a, 106b and the stapling mechanisms 1320, 1370. The one or more glide surfaces (or rollers) 1346, 1396 allow the mechanism to slide smoothly along the inner faces 108, 114 and the one or more glide surfaces (or rollers) 1324, 1374 allow the first and second flange guides 236, 238 to slide smoothly within the channels 1322, 1372, respectively.

The user may fire staples at intervals through the facing 204 as the mechanism 1300 moves along the framing members 106a, 106b. Alternatively, the mechanism 1300 may be equipped with a mechanism for automatically firing staples at predetermined intervals. The user may attach the mechanism 130 to the first flange guide 236 and the second flange guide 238 at or near the first end surface 220 or the second end surface 222 of the insulation body 202. The user may then quickly staple along the length of the second portion 232 and third portion 234 simultaneously by sliding the mechanism 1300 along inner faces 108, 114 of the framing members 106a, 106b while firing staples at intervals along the length, thus resembling a zipper or zipping process.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not limited to building sidewalls having insulation installed between wall studs. Thus, for example, use of the inventive concepts to various structural barriers, such as for example roofs, ceilings, walls, and floors, are within the sprit and scope of the general inventive concepts. For example, the inventive concepts may be used on insulation installed between joists, rafters, or trusses in a roof. In addition, the general inventive concepts are not limited to insulation batts. The inventive concepts may be used in conjunction with rolled insulation or loose-fill insulation. For example, the mechanism for securing insulation between structural framing members may be used to secure loose-fill insulation netting or another barrier between structural framing member in order to hold loose-fill insulation in place between framing members. For example, the general inventive concepts of the present disclosure may be used in conjunction with the insulation systems disclosed in U.S. patent application Ser. No. 14/452,696, for "Boxed Netting Insulation for Roof Deck," filed on Aug. 6, 2014, U.S. patent application Ser. No. 14/532,302, for "Roof Insulation Systems, filed on Nov. 4, 2014, and U.S. patent application Ser. No. 14/613,272, for "Roof Insulation Systems," filed on Feb. 3, 2015, the entire disclosures of which are incorporate herein by reference. It is sought, therefore, to cover all such changes and modifications as fall within the spirit and scope of the generally inventive concepts, as described and claimed herein, and equivalents thereof.

The invention claimed is:

1. A fibrous insulation member, comprising:
   a fibrous insulation body, a first lateral surface, a second lateral surface spaced apart from the first lateral surface, and a face extending from the first lateral surface to the second lateral surface, the face having a width;
   a facing having a first portion attached to the first face and extending the width of the face, and a second portion extending beyond the first lateral surface, the second portion including a stapling zone having a first thickness and including a first guide having a second thickness greater than the first thickness;
   wherein the second portion is designed to be attached to a framing member of a building by stapling through the stapling zone.

2. The fibrous insulation member of claim 1, wherein the fibrous insulation body has a length and the first guide extends along a majority of the length.

3. The fibrous insulation member of claim 1 wherein the first guide extends perpendicular from the second portion and has a generally rectangular cross-section.

4. The fibrous insulation member of claim 1 wherein the first guide functions as a male component designed to cooperate with a female component on a stapler.

5. The fibrous insulation member of claim 1 wherein the first portion of the facing includes a first material and the first guide consists of the first material.

6. The fibrous insulation member of claim 1 wherein the material is kraft paper.

7. The fibrous insulation member of claim 1 wherein the first portion of the facing includes a first material and the first guide includes a second material different from the first material.

8. The fibrous insulation member of claim 1 wherein the stapling zone is positioned between the first guide and the first lateral surface.

9. The fibrous insulation member of claim 1, wherein the second stapling zone is positioned between the second guide and the second lateral surface.

10. The fibrous insulation member of claim 1, wherein the facing further comprises a third portion extending beyond the second lateral surface, the third portion defining a second stapling zone having a third thickness and including a second guide having a fourth thickness greater than the third thickness, wherein the third portion is designed to be attached to a framing member of a building by stapling through the second stapling zone.

11. The fibrous insulation member of claim 10, wherein the fibrous insulation body has a length and the first guide and the second guide extend along a majority of the length.

12. The fibrous insulation member of claim 1, wherein the facing has a first side and a second side opposite the first side, and wherein the first guide extends outward from only one of the first side and the second side of the facing.

13. The fibrous insulation member of claim 12, wherein the first guide extends outward from the facing a distance at least twice the thickness of the first portion of the facing.

14. The fibrous insulation member of claim 1, wherein the second thickness is at least three times greater than the first thickness.

* * * * *